US007595112B1

(12) United States Patent
Cano et al.

(10) Patent No.: US 7,595,112 B1
(45) Date of Patent: Sep. 29, 2009

(54) RESIN INFUSION OF LAYERED METAL/COMPOSITE HYBRID AND RESULTING METAL/COMPOSITE HYBRID LAMINATE

(75) Inventors: Roberto J. Cano, Yorktown, VA (US); Brian W. Grimsley, Phoenix, AZ (US); Erik S. Weiser, Yorktown, VA (US); Brian J. Jensen, Williamsburg, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 550 days.

(21) Appl. No.: 11/461,150

(22) Filed: Jul. 31, 2006

(51) Int. Cl.
B32B 38/08 (2006.01)

(52) U.S. Cl. .................. 428/408; 428/221; 428/299.4; 428/301.1; 427/450

(58) Field of Classification Search .................. None
See application file for complete search history.

(56) References Cited

U.S. PATENT DOCUMENTS

| | | | |
|---|---|---|---|
| 3,646,729 A | 3/1972 | Clough et al. | |
| 4,671,984 A * | 6/1987 | Maeda et al. | 428/209 |
| 4,788,084 A | 11/1988 | Morin | |
| 4,942,013 A | 7/1990 | Palmer et al. | |
| 5,037,691 A | 8/1991 | Medney et al. | |
| 5,153,987 A * | 10/1992 | Takahashi et al. | 29/852 |
| 5,227,216 A | 7/1993 | Pettit | |
| 5,334,279 A * | 8/1994 | Gregoire | 216/20 |
| 5,928,767 A | 7/1999 | Gebhardt et al. | |
| 5,967,400 A | 10/1999 | Bell et al. | |
| 6,355,337 B1 | 3/2002 | Piening et al. | |
| 6,783,860 B1 * | 8/2004 | Frater | 428/416 |
| 2003/0077965 A1 | 4/2003 | Mack et al. | |
| 2003/0102151 A1 * | 6/2003 | Hirose et al. | 174/250 |
| 2003/0102604 A1 | 6/2003 | Mack et al. | |
| 2003/0143373 A1 | 7/2003 | Bledsoe et al. | |
| 2003/0211194 A1 | 11/2003 | Louderback et al. | |
| 2004/0096674 A1 | 5/2004 | Hansson et al. | |
| 2004/0175554 A1 | 9/2004 | Clifford et al. | |
| 2004/0194424 A1 | 10/2004 | Frost et al. | |

(Continued)

FOREIGN PATENT DOCUMENTS

| | | |
|---|---|---|
| EP | 1235672 B1 | 2/2005 |
| WO | WO 2005/016639 A2 | 2/2005 |

OTHER PUBLICATIONS

U.S. Appl. No. 12/124,273, Stephen J. Hales, et al.
Boulos, M. "RF induction plasma spraying: State-of-the-art review". Journal of Thermal Spray Technology, 1992, 1 (1) 33-40., Boston, USA.

*Primary Examiner*—Jennifer McNeil
*Assistant Examiner*—Vera Katz
(74) *Attorney, Agent, or Firm*—Robin W. Edwards

(57) ABSTRACT

A method of fabricating a metal/composite hybrid laminate is provided. One or more layered arrangements are stacked on a solid base to form a layered structure. Each layered arrangement is defined by a fibrous material and a perforated metal sheet. A resin in its liquid state is introduced along a portion of the layered structure while a differential pressure is applied across the laminate structure until the resin permeates the fibrous material of each layered arrangement and fills perforations in each perforated metal sheet. The resin is cured thereby yielding a metal/composite hybrid laminate.

24 Claims, 4 Drawing Sheets

U.S. PATENT DOCUMENTS

| | | |
|---|---|---|
| 2004/0256053 A1 | 12/2004 | Burpo et al. |
| 2005/0037188 A1 | 2/2005 | Ehrstrom et al. |
| 2005/0037678 A1 | 2/2005 | Mack et al. |
| 2005/0139384 A1 | 6/2005 | Suzuki et al. |
| 2005/0175813 A1 | 8/2005 | Wingert et al. |
| 2006/0088690 A1 * | 4/2006 | Arakawa et al. ............ 428/138 |

* cited by examiner

RESIN INFUSION OF LAYERED METAL/COMPOSITE HYBRID AND RESULTING METAL/COMPOSITE HYBRID LAMINATE

ORIGIN OF THE INVENTION

This invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to methods of metal/composite laminate fabrication. More specifically, the invention is a fabrication method involving resin infusion of a layered metal/composite hybrid and the resulting metal/composite hybrid laminate.

2. Description of the Related Art

Metal/composite hybrid laminates provide a combination of structural and functional properties for a variety of applications to include aerospace structures. When comparing a structure made from a metal/composite hybrid laminate with one made from just the parent metal, the hybrid laminate-based structure is lighter in weight, has improved load bearing ability, is stiffer, and has improved fatigue properties. When comparing the hybrid laminate-based structure with one made from just the parent composite, the hybrid laminate-based structure has improved impact resistance, damage tolerance, and permeation resistance.

Currently, metal/composite hybrid laminates are prepared by compressing (e.g., using a press, autoclave, etc.) layers of metal sheets interleaved with layers of fibrous sheets previously impregnated with a resin. The fibrous sheets can be comprised of unidirectionally-arranged fibers or a mesh of woven fibers. The layered structure is typically placed in a mold prior to compression processing thereof. However, both autoclave and press molding techniques require complex tooling and are limited in size/shape owing to the size limitations of autoclave or press molding equipment.

SUMMARY OF THE INVENTION

Accordingly, it is an object of the present invention to provide a method of fabricating a metal/composite hybrid laminate.

Another object of the present invention is to provide a method capable of being used to make relatively large, shaped metal/composite hybrid laminate-based structures.

Still another object of the present invention is to provide a metal/composite hybrid laminate.

Other objects and advantages of the present invention will become more obvious hereinafter in the specification and drawings.

In accordance with the present invention, a method of fabricating a metal/composite hybrid laminate is provided. At least one layered arrangement is stacked on a solid base to form a layered structure. Each layered arrangement is defined by a fibrous material and a perforated metal sheet with the layered arrangement's fibrous material being closer to the solid base than the layered arrangement's perforated metal sheet. A resin in its liquid state is introduced along a portion of the layered structure. A differential pressure is induced across the laminate structure until the resin permeates the fibrous material of each layered arrangement and fills perforations in each perforated metal sheet. The resin is cured thereby yielding a metal/composite hybrid laminate.

DETAILED DESCRIPTION OF THE INVENTION

Figure 1:
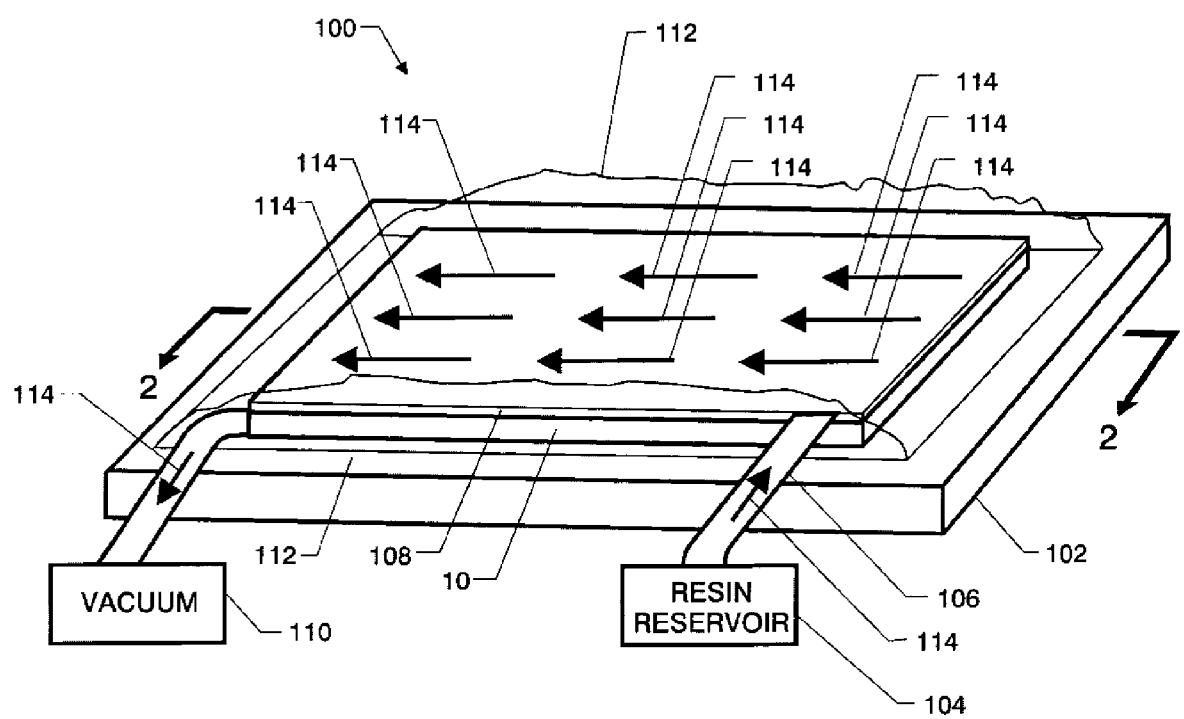
FIG. 1 is a schematic view of a vacuum assisted resin transfer molding set-up for fabricating a metal/composite hybrid laminate in accordance with the present invention.
Figure 2:
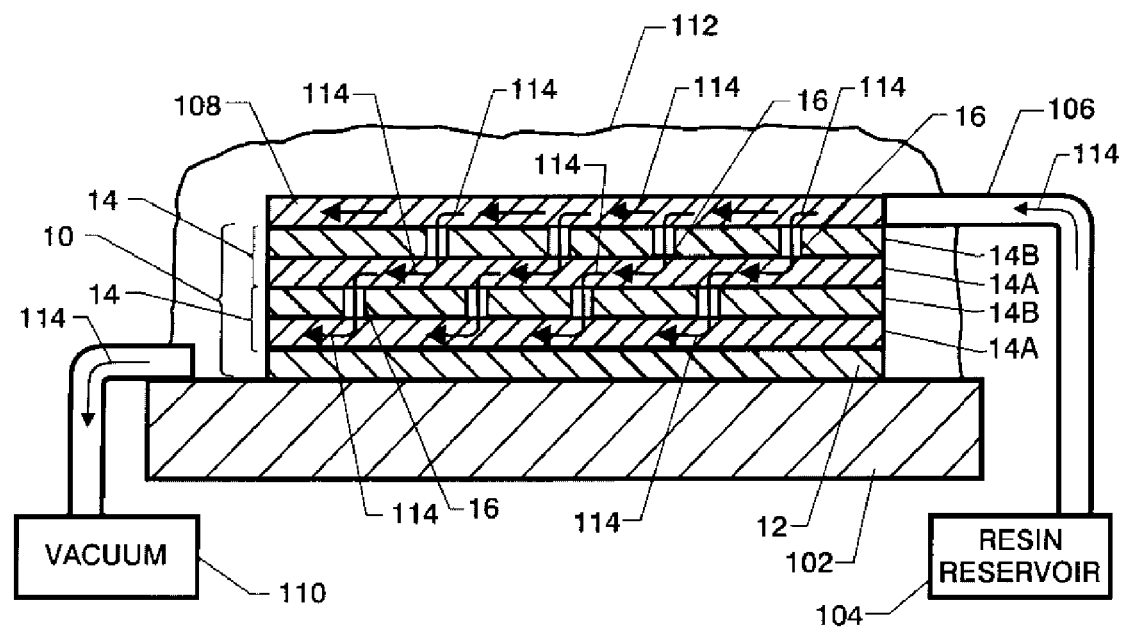
FIG. 2 is a cross-sectional view taken along line 2-2 in FIG. 1 during operation of the vacuum assisted resin transfer molding set-up.

Referring now to the drawings, simultaneous reference will initially be made to FIGS. 1 and 2. A vacuum assisted resin transfer molding set-up (referenced generally by numeral 100) is illustrated with a preform 10 of a metal/composite hybrid laminate that is to be fabricated in accordance with the present invention. Pursuant to the ensuing description, one of ordinary skill in the art will readily recognize that set-up 100 is simply one embodiment of an equipment arrangement that can be used to fabricate the present invention's metal/composite hybrid laminate. Accordingly, it is to be understood that the fabrication method and resulting metal/composite hybrid are not limited by the particular configuration of the processing equipment.

Preform 10 is a multi-layer structure that includes a base layer 12 and at least one layered arrangement 14 (e.g., two are illustrated in FIG. 2) of a fibrous material 14A and a perforated metal sheet 14B. Base layer 12 is a solid material that is typically a solid sheet or foil or metal. For each layered arrangement 14, fibrous material 14A is closer to base layer 12 than its corresponding perforated metal sheet 14B. Each layer of fibrous material 14A is an arrangement of fibers that, through processing in accordance with the present invention, will become the composite portion of the metal/composite hybrid laminate. In general, fibrous material 14A is any porous fibrous arrangement to include unidirectionally-arranged fibers or an open woven mesh that is permeable with respect to a liquid resin as will be explained further below. Suitable choices for fibrous material 14A include, but are not limited to, unidirectionally extending glass fibers, graphite fibers, KEVLAR® fibers, SPECTRA® fibers, M5® fibers, ZYLON® fibers, or other suitable fibers, or open mesh fabrics made from such fibers. Base layer 12 and each perforated metal sheet 14B is any suitable metal (e.g., steel, aluminum, titanium, etc.) in sheet or foil form that will become the metal portion of the metal/composite hybrid laminate. The perforated metal sheets could also be surface treated to alter or tailor the adhesion between layers depending on the required level of adhesion required for the particular application.

Figure 3:
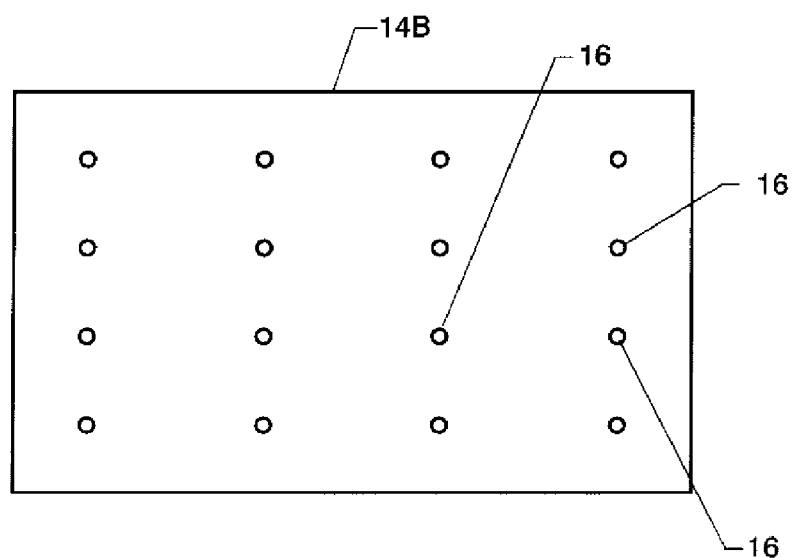
FIG. 3 is a planar view of one of the perforated metal sheets in the hybrid laminate.

Referring additionally to FIG. 3, each perforated metal sheet 14B has an arrangement of holes 16 formed therethrough that will become pathways for transverse-plane resin transfer during processing and that will provide an improved means of bonding in the ultimate metal/composite hybrid laminate. The particular size, shape, and arrangement of holes 16 will be governed by the desired processing and ultimate application of the metal/composite hybrid laminate and are, therefore, not limitations of the present invention. In general, the size of holes 16 must be large enough to permit resin transfer therethrough yet small enough so as not to negatively impact the structural integrity of the ultimate metal/composite hybrid laminate. The shape of holes 16 can be circular, elliptical, square, rectangular, slotted, etc., without departing from the scope of the present invention. Similarly, the arrangement of holes 16 can be varied without departing from the scope of the present invention. Further, the arrangement of holes 16 can be the same between layered arrangements 14 (in which case holes 16 will be aligned throughout preform 10 and the ultimate metal/composite hybrid laminate), or the arrangement of holes 16 can be different between layered arrangements 14 (in which case holes 16 will be misaligned throughout preform 10 as illustrated in FIG. 2 and the ultimate metal/composite hybrid laminate).

Set-up 100 includes the following:
- a tool or support 102 that may be coated or covered with a non-stick material (not shown) on which preform 10 rests,
- a resin reservoir 104 containing suitable resin (e.g., epoxy, cyanate ester, bismaleimide, polyimide, etc.),
- a resin distribution arrangement coupled to resin reservoir 104 that includes a delivery conduit 106 and a planar and porous resin distribution media 108 that is positioned over preform 10 and that receives resin via conduit 106 and readily facilitates resin distribution over the area of media 108 (although not shown to preserve clarity in the illustration, a release material is typically placed between preform 10 and distribution media 108 to facilitate removal of media 108 after cure as would be well known in the art), and
- a vacuum application arrangement that includes a vacuum 110 and a vacuum bag 112 sealed to tool 102 over the top of preform 10 and distribution media 108.

In operation, preform 10 is positioned on tool 102 with distribution media 108 being arranged over the top of preform 10, i.e., the top or exposed one of perforated metal sheets 14B. Suitable choices for the distribution media 108 include, but are not limited to, PLASTINET® bi-planar nylon-6 mesh available from Applied Extrusion Technology for low temperature infusions and metal, such as aluminum, screen for high temperature applications. Vacuum bag 112 is sealed in place about the periphery thereof and vacuum 110 is turned on. As a result, resin (represented by flow arrows 114) is drawn from reservoir 104 to one end of distribution media 108 and then across to the other end of distribution media 108. Other means of positively providing or introducing resin 114 to distribution media 108 could be used without departing form the scope of the present invention. The vacuum force generated by vacuum 110 is applied to the lower portion of preform 10 near base layer 12. In this way, the vacuum force is drawn transversely through preform 10 via fibrous material 14A and holes 16 in perforated metal sheets 14B. As a result, resin 114 flows transversely through preform 10 via fibrous material 14A and holes 16. The vacuum force is applied until each fibrous material 14A is permeated with resin 114 and holes 16 are filled with resin 114.

Figure 4:
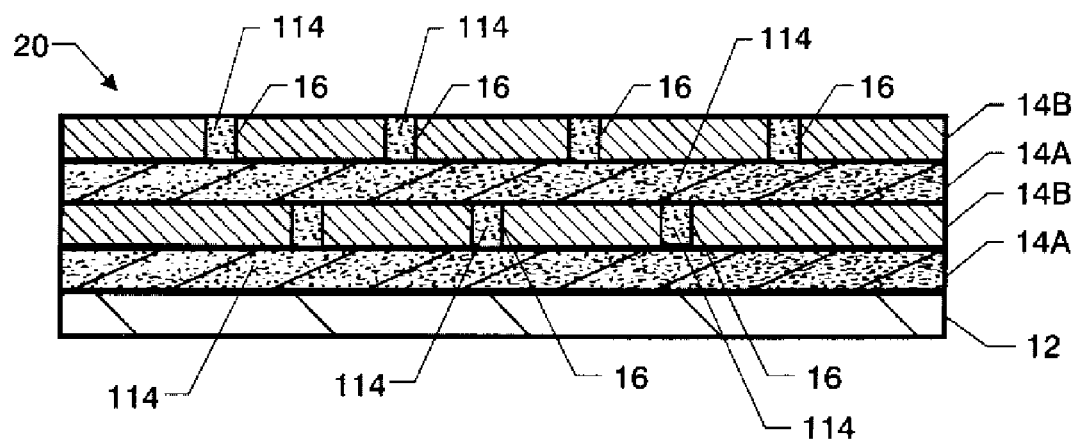
FIG. 4 is a cross-sectional view of an embodiment of a metal/composite hybrid laminate fabricated in accordance with the present invention.
Figure 5:
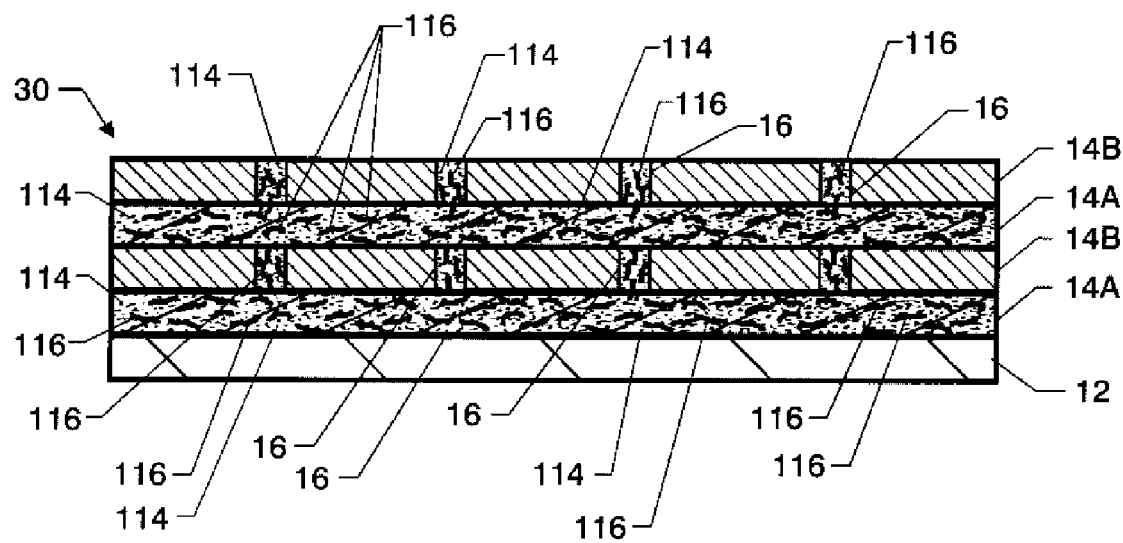
FIG. 5 is a cross-sectional view of another embodiment of a metal/composite hybrid laminate fabricated in accordance with the present invention.

The resulting preform 10 with resin 114 impregnated therein is cured in accordance with the curing specifications of the particular resin and then removed from set-up 100. For example, curing typically takes place on tool 102, although sometimes a free-standing post cure is performed after an initial cure depending on the particular resin system. The resulting metal/composite hybrid laminate 20 is illustrated in FIG. 4 with cured resin 114 (i.e., represented by the "stippling" marks) filling holes 16 and permeating fibrous material 14A. Processing in accordance with the present invention provides that cured resin 114 is contiguous throughout laminate 20 thereby improving the intra-adhesion properties of the laminate. As shown in FIG. 4, holes 16 can be misaligned throughout laminate 20. However, the present invention can also be used to fabricate a metal/composite hybrid laminate 30 (FIG. 5) where holes 16 are aligned with one another throughout the laminate. Furthermore, laminate 30 also illustrates that resin 114 can have reinforcing inclusions 116 mixed therein. Inclusions 116 are any conventional reinforcing material (e.g., chopped fibers, carbon nanotubes, etc.) that are small enough to be mixed in (liquid) resin 114 and pass through holes 16 and fibrous material 14A during the resin infusion processing portion of the present invention.

Figure 6:
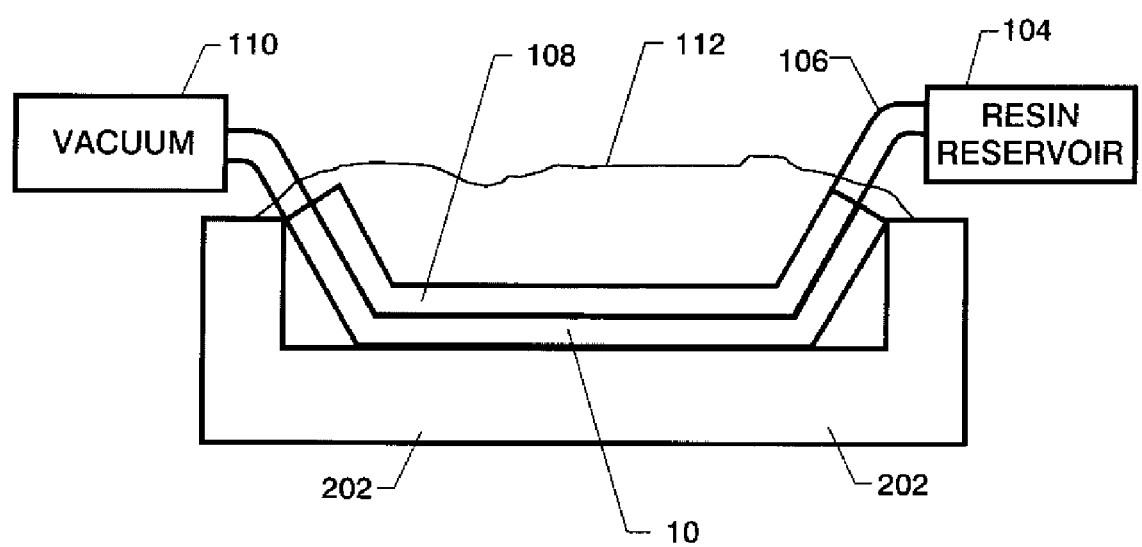
FIG. 6 is a side view of a shaped support used to fabricate a shaped metal/composite hybrid laminate in accordance with the present invention.

For ease of illustration and description, tool 102 was illustrated as a flat support. However, the present invention is not so limited as the tool or support can be shaped as illustrated in FIG. 6 where tool 202 defines a shape to which preform 10 conforms when placed therein/thereon. Processing in this configuration is the same as previously described.

By way of example, a flat hybrid laminate was fabricated using three layers of stainless steel foil with two layers of 5-harness satin biaxial woven fabric composed of HEXCEL® 6k IM7 carbon fiber tows sandwiched between each stainless steel foil. The stainless steel foils were 5 inches×5 inches and 0.003 inches thick. Each graphite fabric layer was 6 inches×6 inches and 0.0134 inches thick prior to infusion. Flow pathways were introduced by machining with a number 80 wire drill bit to an approximate diameter of 0.0134 inches in a staggered pattern approximately one inch apart. The hybrid laminate was subjected to non-destructive testing including thermography and x-ray analysis. The test results indicated a high quality laminate having very low void content.

By way of further example, a curved hybrid laminate, with a radius of curvature ranging from 6 inches on one side to 5.5 inches on the other side, was fabricated. The laminate was 8 inches wide and 10 inches long on the smaller radius side and 12 inches long on the larger radius side. The same metal foil as the earlier example and two stacks of multi-axial warp knit (MAWK) carbon fabric were utilized. The same flow pathway size and pattern as the earlier example was utilized and the compacted thickness of each stack of MAWK fabric was 0.055 inches. Non-destructive testing including thermography and x-ray analysis indicated a quality hybrid laminate having very low void content.

The advantages of the present invention are numerous. The processing method provides for the fabrication of a variety of size/shape metal/composite hybrid laminate structures without the drawbacks associated with conventional autoclave or press molding techniques. The resulting metal/composite hybrid laminate has improved adhesion between the constituent layers thereof and is mechanically improved as the cured resin simultaneously bonds to the metal surfaces and holds the assembly together via its contiguous presence in the metal sheets' perforations. The contiguous presence of the resin in the metal sheet's perforations provides a through-the-thickness reinforcement that can improve impact resistance and damage tolerance. As mentioned above, alternative embodiments could be configured to provide a reduced adhesion strength at the surface between layers. Such reduced adhesion could be utilized as a means of energy absorption by delamination of the layers while maintaining structural integrity with the through-the-thickness, inclusion-reinforced, resin-filled perforations.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A metal/composite hybrid laminate, comprising:
   a solid base;
   a stack of at least one layered arrangement on said solid base to form a layered structure, each such layered arrangement comprising a fibrous material layer and a perforated metal sheet layer, wherein said fibrous material layer of each layered arrangement is closer to said solid base than said perforated metal sheet layer of the same layered arrangement; and
   a cured resin permeating said fibrous material layers and filling perforations in said perforated metal sheet layers.

2. A metal/composite hybrid laminate as in claim 1 further comprising inclusions mixed in said cured resin wherein said inclusions are sized to fit through perforations in each of said perforated metal sheet layers and openings in said fibrous material layers.

3. A metal/composite hybrid laminate as in claim 2 wherein said inclusions are selected from the group consisting of fibers and carbon nanotubes.

4. A metal/composite hybrid laminate as in claim 1 wherein said perforations between adjacent ones of said perforated metal sheet layers are aligned.

5. A metal/composite hybrid laminate as in claim 1 wherein said perforations between adjacent ones of said perforated metal sheet layers are misaligned.

6. A metal/composite hybrid laminate as in claim 1 wherein each of said fibrous material layers is selected from the group consisting of unidirectionally-aligned fibers and a woven mesh of fibers.

7. A method of fabricating a metal/composite hybrid laminate according to claim 1, comprising the steps of:
   providing a solid base;
   stacking at least one layered arrangement on said solid base to form a layered structure, each said layered arrangement defined by a fibrous material and a perforated metal sheet wherein, for each said layered arrangement, said fibrous material associated therewith is closer to said solid base than said perforated metal sheet associated therewith;
   inducing a differential pressure across said laminate structure;
   introducing a resin in its liquid state along a portion of said layered structure wherein said differential pressure causes said resin to permeate said fibrous material of each said layered arrangement and fill perforations in said perforated metal sheet of each said layered arrangement; and
   curing said resin after said resin permeates said fibrous material of each said layered arrangement and fills perforations in said perforated metal sheet of each said layered arrangement.

8. A method according to claim 7 wherein said solid base is a base sheet of solid metal, said method further comprising the step of placing said base sheet on a support structure.

9. A method according to claim 8 wherein said support structure is shaped, and wherein said step of placing includes the step of conforming said base sheet and said a least one layered arrangement to the shape of said support structure.

10. A method according to claim 7 wherein said portion of said layered structure is at a first end of said layered structure.

11. A method according to claim 10 where said step of inducing comprises the step of applying a vacuum to a second end of said layered structure that is displaced from said first end.

12. A method according to claim 7 further comprising the step of mixing inclusions into said resin prior to said step of introducing wherein said inclusions are sized to fit through said perforations in each said perforated metal sheet and openings in said fibrous material.

13. A method according to claim 12 wherein said inclusions are selected from the group consisting of fibers and carbon nanotubes.

14. A method according to claim 7 wherein said perforations between adjacent ones of said layered arrangements are aligned.

15. A method according to claim 7 wherein said perforations between adjacent ones of said layered arrangements are misaligned.

16. A method of fabricating a metal/composite hybrid laminate according to claim 1, comprising the steps of:
   providing a solid base with a stack of fibrous material layers interleaved with perforated metal sheet layers positioned on said solid base, wherein one of said fibrous material layers is adjacent said solid base and one of said perforated metal sheet layers forms a top layer of said stack;
   providing a resin in its liquid state at said top layer;
   inducing a differential pressure across said stack until said resin permeates said fibrous material layers and fills perforations in said perforated metal sheet layers; and
   curing said resin after said step of inducing.

17. A method according to claim 16 wherein said solid base is a sheet of solid metal, said method further comprising the step of placing said sheet on a support structure.

18. A method according to claim 17 wherein said support structure is shaped, and wherein said step of placing includes the step of conforming said sheet and said stack to the shape of said support structure.

19. A method according to claim 16 wherein said step of inducing comprises the step of applying a vacuum to a portion of said stack that is displaced from said top layer.

20. A method according to claim 19 wherein said portion of said stack is adjacent to said solid base.

21. A method according to claim 16 further comprising the step of mixing inclusions into said resin prior to said step of introducing wherein said inclusions are sized to fit through said perforations in each of said perforated metal sheet layers and openings in said fibrous material layers.

22. A method according to claim 21 wherein said inclusions are selected from the group consisting of fibers and carbon nanotubes.

23. A method according to claim 16 wherein said perforations between adjacent ones of said perforated metal sheet layers are aligned.

24. A method according to claim 16 wherein said perforations between adjacent ones of said perforated metal sheet layers are misaligned.

* * * * *